INVENTOR
Russell F. Erickson

United States Patent Office 3,530,034
Patented Sept. 22, 1970

3,530,034
CONTINUOUS AQUEOUS PREHYDROLYSIS OF WOOD CHIPS
Russell F. Erickson, Scarsdale, N.Y., assignor to ITT Rayonier Incorporated, a corporation of Delaware
Continuation of application Ser. No. 526,101, Feb. 9, 1966, which is a continuation-in-part of application Ser. No. 388,331, Aug. 7, 1964. This application May 16, 1969, Ser. No. 827,111
Int. Cl. D21c 3/26
U.S. Cl. 162—19
8 Claims

ABSTRACT OF THE DISCLOSURE

A continuous process for the prehydrolysis of wood chips preparatory to the digestion thereof is disclosed which comprises presteaming the chips, subjecting the presteamed chips to a high temperature hydrolysis during which volatile chemicals are separated, passing the hydrolyzed chips countercurrent to cooling water to cool the chips and to wash released chemicals therefrom and discharging the chips from the vessel at atmospheric pressure to flash liquid from the interior of the chips.

---

Figure 1:
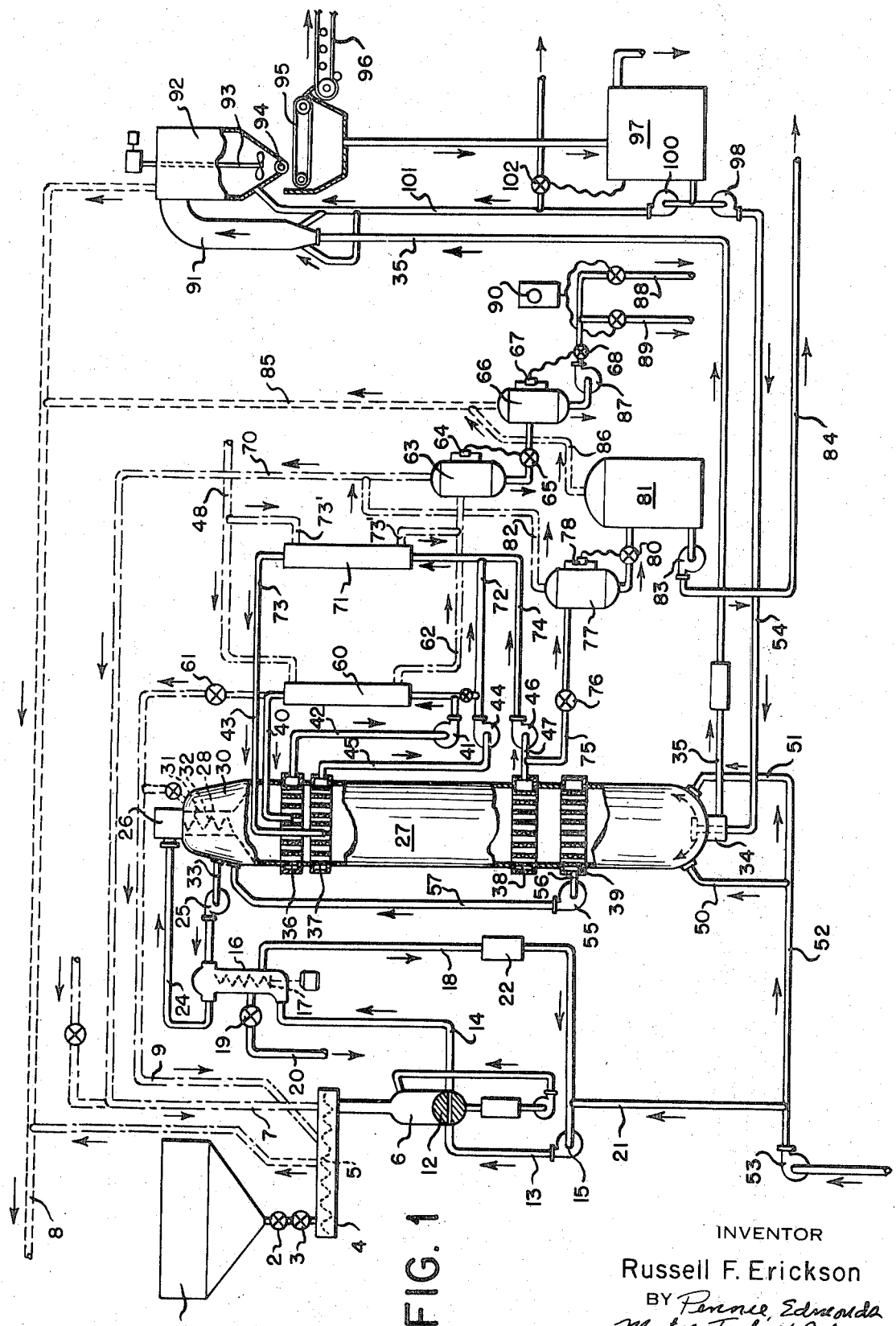

This application is a continuation of my application Ser. No. 526,101, filed Feb. 9, 1966 and a continuation-in-part of my application Ser. No. 388,331, filed Aug. 7, 1964, now abandoned.

This invention relates to the aqueous prehydrolysis of wood chips, and has for its object the provision of an improved continuous aqueous high temperature prehydrolysis followed by water washing and cooling carried out in a pressure vessel and resulting in removal of a high proportion of hydrolyzate chemicals, recovery of volatiles and production of an improved product. Additionally, the invention provides for the recycling of steam and hot aqueous liquors in an interchange system for the efficient recovery and utilization of heat and chemicals. The prehydrolysis of the invention may be carried out with either hot water or steam will be referred to herein broadly as aqueous prehydrolysis.

Advantageously the continuous process of the invention comprises several interconnected stages. The first stage consists of a relatively mild treatment with steam and/or hot water to remove volatile matter and to heat and moisten the chips. The chips are then passed continuously into the upper end of an upright pressure vessel where, as they descend, they are hydrolyzed with either water or saturated steam at high temperatures and pressures. Then, while still in the pressure vessel, the hydrolyzed chips pass into a washing stage where they are countercurrently washed with cooling water following which they are discharged from the vessel at such a low pressure as to effect flashing of contained liquid into steam.

In the variation of the process in which the chips are hydrolyzed with hot water the chips and associated liquor descend together cocurrently through a reaction zone in the vessel in which the period is timed to permit completion of the hydrolysis in from 15 to 75 minutes. During the hydrolysis the chips under hydraulic pressure are treated at a temperature of from 150° to 180° C. with forced cocurrent circulation of the aqueous liquor a fraction of which is continuously bled out of the circuit to remove dissolved chemicals.

In another variation of the process in which the chips are hydrolyzed with saturated steam the chips from the initial midl treatment again descend through a reaction zone in the pressure vessel in a period timed to permit completion of the hydrolysis in from 15 to 75 minutes. During the hydrolysis the chips are treated with forced circulation of saturated steam at from 150° to 180° C.

and corresponding pressures. Hydrolysis is terminated by contact of the chips with the interface between the saturated steam and the countercurrently circulating wash water of the ensuing washing stage.

In each variation of the process the water associated with the hydrolyzed chips from the high temperature hydrolysis, whether said hydrolysis is effected by water or steam, is actually an acidic aqueous liquor containing dissolved chemicals generated by the hydrolytic action of the hot water or steam on the wood. The chips following prehydrolysis with either hot water or saturated steam enter a wash section of the vessel. Here they are countercurrently washed with relatively cool water for the further removal of chemicals and the lowering of the temperature of the hydrolyzed chips to from 105° to 130° C., preferably to about 115° C., so that without damage to said chips they may be removed from the vessel at atmospheric pressure with controlled flashing of liquid from the interior of the chips as steam. Hydrolyzed chips prepared in this manner can be dewatered and subjected to any desired wood pulping process.

In addition to hydrolyzed chips the invention provides an important flashing treatment of the hydrolyzate that is bled off during hydrolysis thereby providing steam and increasing the concentration of solids in this by-product solution. A high degree of removal of chemicals formed during prehydrolysis from both the interior and exterior of the chips is effected by the countercurrent washing stage of the process and the flashing of liquid from the interior of the chips as they are discharged from the pressure vessel to atmospheric pressure. These washing and flashing procedures provide increased efficiency in recovery of hydrolyzate chemicals and prevent undesirable reactions with the same in subseqeunt processing of the hydrolyzed chips. The invention also minimizes contact of hydrolyzate chemicals with and consequent fouling of the feed valve mechanisms.

Figure 2:
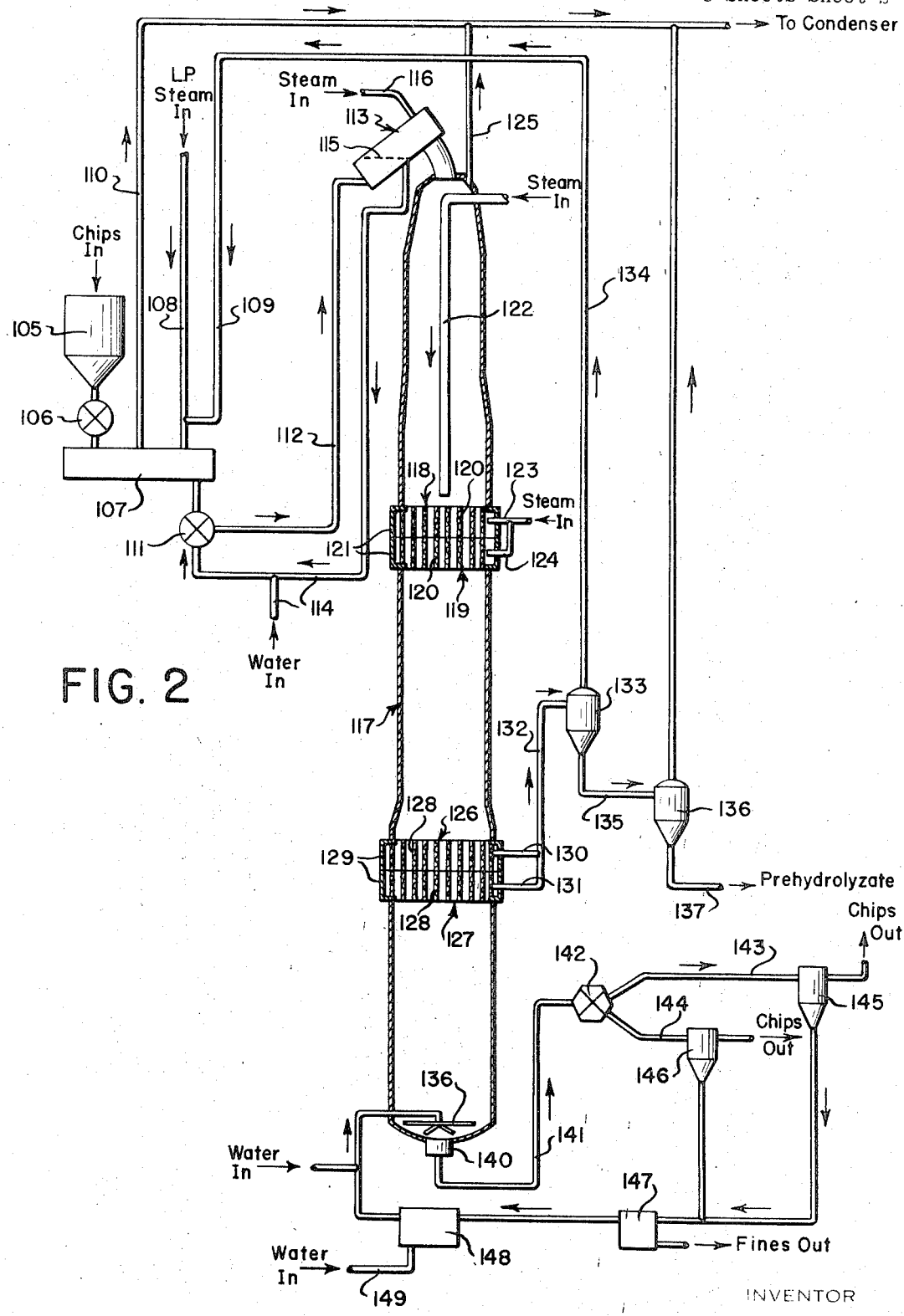
Figure 3:
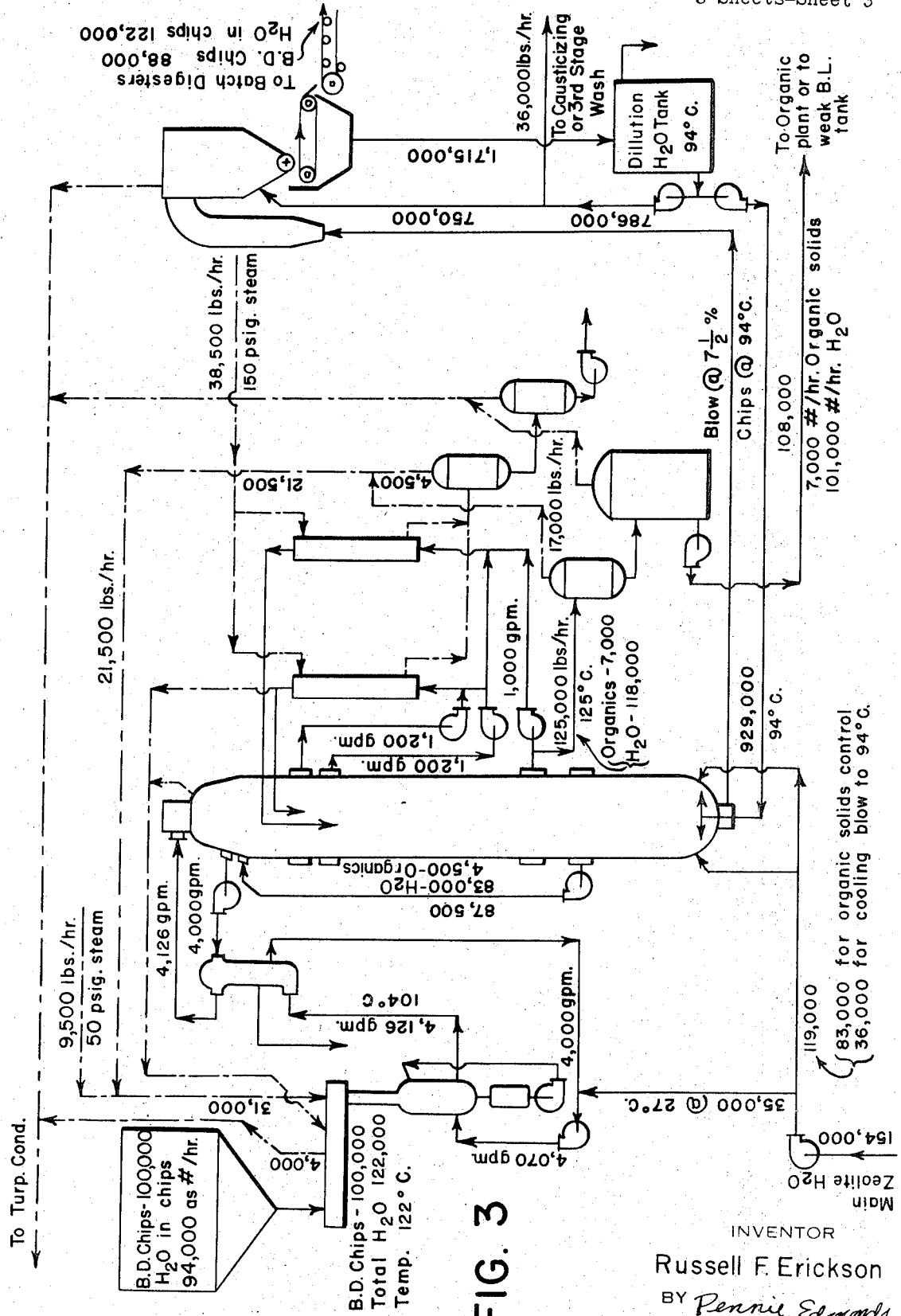

These and other novel features of the invention will be better understood after considering the following discussion in relation to the accompanying drawings in which FIG. 1 is a diagrammatic illustration of an arrangement of apparatus for carrying out a prehydrolysis process of the invention with steam and hot water;

FIG. 2 is a diagrammatic illustration of an arrangement of apparatus for carrying out the prehydrolysis with steam, and FIG. 3 illustrates an example of a typical process of the invention in which the prehydrolysis is carried out with water.

A typical process of the invention employing prehydrolysis with water will now be described as carried out in the arrangement of apparatus illustrated in FIG. 1 in which the pipes shown in broken lines carry steam or steam and hot water. The wood chips are stored in the hopper 1 which has a tapered bottom leading to a rotary chip meter 2 which is in turn connected to a rotary low-pressure feeder 3. The feeder 3 is connected to and feeds the chips into the pretreatment pressure vessel 4 which is equipped with a steam supply means and a screw feeder 5 which forces the chips toward an opening over the pocket feeder 6. The chip meter 2 and pressure feeder 3 may be of any suitable types which are operated in such a manner that the passage into the pressure vessel 4 is closed when the chips are transferred from the chip meter 2 to the pressure feeder 3. The pressure vessel 4 may accordingly be operated under any suitable pressure. Steam is introduced into the vessel through the pipe 7 from another part of the system (may include volatile organics) to raise the temperature to approximately 122° C. This temperature volatilizes some terpenes and other compounds which are removed through pipe 8 to a condenser not shown. Some steam is also added to the vessel 4 through pipe 9 from a part of the process which may release volatile organics.

The prehydrolysis effected in vessel 4 is only incidentally due to steaming since the temperature is lower and the time shorter than in the main vessel.

The wood chips which fall into the pocket feeder 6 enter a rotary high-pressure feeder 12 at the bottom. This feeder is rotated by power means not shown in a cycle of operation so that in one position the chips and surrounding water enter a pocket. When the pocket is sequentially aligned with the pipes 13 and 14 the water under an appreciable pressure created by the pump 15 forces the chips in a slurry of water into the lower end of the chip screw feeder 16. In this feeder the chips are pushed upwardly by the motor driven screw 17 which squeezes out an appreciable amount of the water which is returned through pipe 18 to the pump 15. Some overflow water may be removed from the chip feeder through the relief valve 19 and overflow pipe 20. The water accompanying the chips into the pocket feeder 6 is at a temperature of about 122° C. but there is a slight loss in temperature in the water and chip mixture flowing into the chip feeder 16. In addition, some make-up water at normal temperatures is added to the circuit through pipe 21. If desired a heater 22 may be used in the chip feeding circuit to maintain the desired temperature of approximately 104° C.

The chips pushed upwardly through the feeder 16 are fairly free of the water introduced through the feed valve 12 and as they reach the top they are blown into the pipe 24 by water from the pump 25. Pipe 24 connects to a feed header 26 at the top of an upright treatment vessel 27 which is preferably cylindrical in cross-section and relatively very high in relation to the diameter. This vessel, constructed to be operated under hydraulic pressure, may conveniently be similar to the well known Kamyr pulp digester although other types of reaction chambers may be used for carrying out the high temperature hydrolysis followed by cooling and washing of the chips. The Kamyr type digester illustrated includes a tapered upper end having an interior screen 28 forming a generally annular dome 30 for receiving water screened from the chips. A central cylindrical area 31 within the srceen is provided with a worm feeder 32 which receives the chips and the accompanying aqueous liquor from the header 26. This screw effects a limited amount of compression forcing much of the accompanying aqueous liquor into the dome 30 from which it is received by the pump 25 through the pipe 33.

The remaining inner portion of the vessel 27 is an open cylindrical space which is completely filled with chips and the particular aqueous medium in contact with the chips at a particular section or horizontal zone. The chips accordingly are continuously moved downward through the vessel to the outlet box 34 from which they flushed into the pipe 35.

The vessel 27 has four surrounding screen sections 36, 37, 38 and 39 each of which has a multiplicity of vertical ribs and slots which permit the chips to pass freely thereover and the liquid to pass freely therethrough. As the chips enter the area or zone of screen 36 they are charged with water at a high temperature of from 150° to 180° C. preferably at a temperature of about 170° C. through pipe 40. The pump 41 is connected to the annular space surrounding the screen section 36 by pipe 42 which sucks this high temperature water through the chips and passes it into a part of the system hereinafter to be described. As the chips move downwardly to the zone or area of screen 37 they are again charged with high temperature water at a temperature of from 150° to 180° C. preferably at a temperature of about 175° C. through the pipe 43. The pump 44 is connected by pipe 45 to the annular space surrounding screen section 37 and this pump sucks the high temperature water through the chips and also discharges the resulting liquor into another part of the system hereafter to be described. The chips passing through the zone between screen sections 37 and 38 are at a preferred temperature of about 175° C. In a typical operation it required about thirty minutes for the chips to pass from the header 26 to pass section 37 and about forty-five minutes more to reach screen section 38. During this time the chips undergo an effective high temperature aqueous hydrolysis and when they reach the zone of screen 38 the liquor containing a substantial portion of the dissolved organic acids and other material including hemicellulose is removed from the screen section 38 by the pump 46 and pipe 47.

It will be appreciated that the chips and the hydrolyzing water flow cocurrent from the header 26 to the zone of screen section 38. At this stage, the chips containing dissolved chemicals are at too high a temperature to be released to the atmosphere without injury. The process of the invention includes an important countercurrent washing and cooling of the chips in the area below the zone of screen section 39. At spaced positions near the bottom of the vessel 37 pipes 50 and 51 introduce cooling water such as tap water from the pipe 52 and pump 53. This cooling water is supplemented by dilute liquor containing some chemicals in solution from another part of the system through pipe 54. The weak solution from pipe 54 and the cool water from pipes 50 and 51 pass upwardly through the vessel to the zone of screen section 39 countercurrently to the descending chips and the pump 55, connected to the annular space surrounding the screen section 39 by pipe 56, applies sufficient suction to remove this cool water which is at a temperature in the range of from 130° to 170° C., preferably at a temperature of approximately 150° C. This water is forced upwardly through pipe 57 into the dome 30 at the top of the vessel 27.

The aqueous liquor from pump 41 flows through the heat exchanger 60 to bring the temperature up to the preferred temperature of about 170° C. for circulation through the chips by means of pipe 40. The heat exchanger is supplied with steam at a pressure of about 150 p.s.i.g. Some solution from pipe 40 is bled through valve 61 and into pipe 9 for the presteaming treatment in vessel 4 and to remove dissolved gases formed during prehydrolysis. The condensate from the heat exchanger 60 is sent through pipe 62 into the flash chamber 63 wherein a level of liquid is maintained by the float 64 which operates the electric impulse valve 65 to maintain the level of liquid. The accumulated liquid or liquor enters the tank 66 wherein the level of liquid is maintained by the float indicator 67 which in turn operates the electric impulse valve 68 which is adjusted to discharge the residual liquid.

In the tank 63 steam is flashed off and sent through pipe 70 to pipe 7 for presteaming chips in chamber 4. The heat exchanger 71 receives the aqueous liquor from pump 44 via pipe 72 and charges it through pipe 73 back into the zone surrounding the screen section 37. The heat exchanger 71 is also supplied with high pressure steam through pipe 48. The water circulated over the chips from pipe 73 is at a temperature of from 150° to 180° C. preferably at a temperature of about 175° C. The condensate from the heat exchanger 71 flows through pipe 73' into pipe 62 and then into the flash chamber 63.

The pumps 41 and 44 and their connected pipes maintain the circulation of high temperature water containing some dissolved chemicals through the chips in the zones within the screen sections 36 and 37.

The pump 46 sucks the aqueous liquor from the zone of screen section 38 and delivers it into pipe 74 which joins pipe 72 for the delivery of some of this liquor into heat exchanger 71. The pipe 75 connects to pipe 47 ahead of pump 46 and by means of the valve 76 a desired portion of the aqueous liquor from the zone of screen section 38 is sent into the flash chamber 77. In this flash chamber a level of liquid is maintained by the float indicator 78 which operates the electric impulse valve 80 to maintain the level of liquid and remove the accumulation by means of drainage into the enclosed vessel 81. Since steam is flashed out of chamber 77 and flows through pipe 82 into pipe 70 the liquid maintained in vessel 77 increases in concentration so that the liquid flowing through valve 80 into tank 81 contains a high concentration of organic solids. The accumulated solution in tank 81 is removed by pump 83 and delivered through pipe 84 to any suitable organics-recovery system.

In vessel 66 steam together with volatile organic chemicals such as turpentine are flashed off and passed through pipe 85 to the condenser for recovering turpentine and other volatile chemicals. Volatile chemicals are also released from the vessel 81 and these escape through pipe 86 which joins with pipe 85. When the valve 68 is opened by the control switch 67 the pump 87 forces the accumulated liquid into either of pipes 88 or 89 depending upon whether the indicator 90 is set to control the flow of liquid through pipe 88 to waste or a sewer or through pipe 89 to the powerhouse.

The slurry of prehydrolyzed chips is delivered through pipe 35 into an enlarged upright chamber 91 to decrease the velocity so that the slurry of chips can be dumped into the blow tank 92 wherein it is agitated by the impeller 93 and discharged through the rotary feed valve 94 onto the dewatering screen conveyor 95. The screened chips may be deposited onto another conveyor 96 and are ready for delivery to a pulp digester. The separated water contains some dissolved chemicals and is delivered to the tank 97. A part of this dilute solution which is at ambient temperature can be forced by means of pump 98 through pipe 54 into the lower portion of the vessel 27 to aid in washing and cooling the prehydrolyzed pulp. If desired a part of this dilute solution can be forced by means of pump 100 up through pipe 101 into the blow tank 92 or alternatively into the lower portion of vessel 91. A suitable float gauge may be installed in tank 97 to operate the electric impulse valve 102 to discharge to the sewer any desired portion of the solution entering tank 97.

FIG. 2 illustrates an arrangement of apparatus for carrying out the steam prehydrolysis process of the invention. The wood chips are stored in the hopper 105 which supplies chips to the rotary low pressure feed valve 106 which feeds them into the presteamer 107 wherein the chips are given a pretreatment with low-pressure steam supplied through pipes 108 and 109 and the volatiles are removed through pipe 110 to a condenser (not shown). From the presteamer the chips are fed by the rotary high pressure feed valve 111 through pipe 112 into the inverted separator 113. To facilitate transfer of the chips water is supplied to the valve 111 through pipe 114 and this water is removed at the liquid level 115 in the separator and is circulated with the chips through pipes 112 and 114. The wet chips from the separator are blown by means of steam from pipe 116 into the top of the upright treatment vessel 117 which is preferably cylindrical in cross-section and relatively very high in relation to its diameter. This vessel may be a modification of the well known Kamyr pulp digester although other types of reaction vessels may be used for carrying out the process. The vessel must be constructed to contain the steam at a pressure corresponding to steam at 180° C. or higher. The chips are continuously added at the top and continuously removed at the bottom of the vessel, the rates being controlled to maintain the vessel 117 filled or practically filled.

At a level above the center two peripheral filter strainers 118 and 119 are built into the vessel consisting of upright ribs 120 and collars 121 which permit the exchange of fluid but do not impede the movement of the chips. Saturated steam at a temperature of from 150° to 180° C. at the corresponding pressure is forced into the chips through pipe 122 which are subjected to this steam prehydrolysis for from 15 to 60 minutes while moving from the top of the vessel to the strainers 118 and 119. Such high temperature steam is also charged into the collars 121 through pipes 123 and 124 and the openings between the ribs 120. The steam volatilizes such chemicals as the terpenes which pass out with some steam through pipe 125 and to a condenser (not shown). The steam entering the vessel through the strainers 118 and 119 moves downward with the chips and continues the hydrolysis and formation of water soluble chemicals in the chips. About two-thirds down the vessel a second set of strainers 126 and 127 having upright ribs 128 and collars 129 are provided to remove through pipes 130 and 131 and pipe 132 the water and its soluble organics and excess steam. Relatively cool water enters the bottom of the vessel through the distributor manifold 136 and flows upward countercurrent to the descending chips. This cools the chips to a temperature of from 105° to 130° C. and washes out the dissolved chemicals. At the strainers 126 and 127 a water steam interface is maintained by the counterflow of wash water. Just sufficient water is circulated in this washing stage to solubilize and remove the hydrolysis products from the prehydrolyzed chips in the form of an aqueous product flowing out of the vessel through pipe 132 containing up to about five percent total solids on a weight basis. This water and dissolved chemicals enter the flash tank 133 in which steam flashes off and flows through pipe 134 to pipe 109. The water solution flows through pipe 135 into the vessel 136 wherein steam and volatiles are removed through pipe 137 and flow to the condenser. The water solution of organic chemicals, prehydrolyzate, is sent to an apparatus (not shown) for the recovery of such products as sugars. The wet chips at a temperature of from 105° to 130° C. preferably at about 115° C. are discharged through outlet box 140 and pipe 141 to the blow valve 142 from which they are discharged through either pipe 143 or 144 at atmospheric pressure. This results in the flashing of steam from the chips and the expulsion of solution and its chemicals from the interior of the chips. The flashed chips from pipe 143 are deposited on a dewatering conveyor 145 or from pipe 144 on the dewatering conveyor 146. The drained chips are sent to a pulping digester and the drained liquid containing some chemicals in solution and at a temperature not much above ambient temperature pass over a fines screen 147 to remove the fine material and then enters the dilution tank 148. Cold water is supplied to this tank through pipe 149 to blend the water so that it is in the range of 105° to 130° C.

FIG. 3 illustrates an operation of the invention in which the quantity of fluids circulating through the system and the amount of wood chips are generally typical of the process. It is to be understood that the amounts are not critical and can be varied as required according to the character of the wood and chips and the capacity of the various components of equipment.

I claim:

1. The process for the prehydrolysis of wood chips prior to digestion to prepare them for digestion comprising continuously passing the chips through a series of sequential treatment steps including:

(a) presteaming said chips at substantially atmospheric pressure;

(b) separating the presteaming condensate from the chips;

(c) passing the presteamed chips into a treatment vessel maintained at above atmospheric pressure and having a chip hydrolysis zone and a chip cooling zone;

(d) subjecting the chips to hydrolysis by the action of an aqueous fluid at a temperature of from about 150° C. to about 180° C. while in the chip hydrolysis zone;

(e) separating volatile chemicals from the chips resulting from said hydrolysis;

(f) subjecting the hydrolyzed chips to cooling water flowing countercurrent to the movement of the chips to cool the chips to from about 105° C. to about 130° C. and to dissolve and wash out chemicals released in the hydrolysis; and (g) discharging the chips from the vessel to atmospheric pressure effecting flashing and expulsion of liquid from the interior of the chips.

2. The process of claim 1 in which the hydrolysis is carried out with an aqueous fluid selected from the group consisting of water, steam, acidic aqueous liquors generated by the hydrolytic action of the water or steam on the chips, and mixtures thereof at a temperature of about 170° C., said aqueous fluid being passed in the same direction as the movement of the chips.

3. The process of claim 2 in which the presteaming is at a temperature in the range of 80° C. to 130° C.

4. The process of claim 1 in which the aqueous fluid is water and the chips are in the chip hydrolysis zone for a period of at least 45 minutes.

5. The continuous process for the prehydrolysis of wood chips prior to digestion to prepare them for digestion comprising continuously passing the chips through a series of sequential treatment steps including:

(a) presteaming the chips at substantially atmospheric pressure and at a temperature from about 80° C. to about 130° C.;

(b) flushing the chips with water into the upper portion of a treatment vessel maintained at above atmospheric pressure and having a chip hydrolysis zone and a chip cooling zone;

(c) moving said chips and water concurrently downwardly in the vessel at a temperature of from about 150° C. to about 180° C.;

(d) charging water at a temperature of from 150° C. to about 180° C. into said moving chips while they are in the chip hydrolysis zone to move concurrently therewith;

(e) removing water with its contained dissolved chemicals from the chips and recycling a part of said water with added heat to said chip hydrolysis zone;

(f) maintaining the chips and water in the chip hydrolysis zone at a temperature of about 150° C. to about 180° C. for at least 45 minutes;

(g) passing the chips into a chip cooling zone wherein the chips are washed and cooled with water at a temperature from about 105° C. to about 130° C. flowing countercurrent to the chips;

(h) discharging a slurry of cooled chips and water to atmospheric pressure from the lower portion of the vessel; and (i) separating the chips from most of the wash water.

6. The process of claim 5 including removing water including some wash water from the vessel near the area where said chip hydrolysis zone meets said chip cooling zone and returning said removed water to the upper part of the vessel.

7. The process of claim 5 including flashing steam from a portion of the water removed from the hydrolysis zone to concentrate the solution, and recovering dissolved chemicals from said solution.

8. The process for the prehydrolysis of wood chips prior to digestion to prepare them for digestion comprising continuously passing the chips into and through a series of sequential steps including:

(a) presteaming said chips at substantially atmospheric pressure and at a temperature of from about 80° C. to about 130° C.;

(b) separating the presteaming condensate from said chips;

(c) passing the presteamed chips and saturated steam at a temperature of from about 150° C. to about 180° C. concurrently down a treatment vessel maintained at above atmospheric pressure and having a chip hydrolysis zone and a chip cooling zone;

(d) maintaining the chips in the chip hydrolysis zone for from about 15 to about 60 minutes to effect hydrolysis thereof;

(e) passing the hydrolyzed chips and condensate formed during the hydrolysis into the interface between the chip hydrolysis zone and the chip cooling zone;

(f) countercurrently circulating wash water at a temperature of about 105° C. to about 130° C. over the chips as they move downwardly in the vessel from said interface;

(g) removing wash water and excess steam at the interface; and (h) discharging said chips from the bottom of said vessel to atmospheric pressure.

References Cited

UNITED STATES PATENTS

| | | |
|---|---|---|
| 3,097,987 | 7/1963 | Sloman. |
| 3,165,436 | 1/1965 | Bennett et al. |
| 3,298,899 | 1/1967 | Laakso. |
| 3,380,883 | 4/1968 | Richter et al. |

HOWARD R. CAINE, Primary Examiner

U.S. Cl. X.R.

162—60, 68